United States Patent [19]

Carrara

[11] Patent Number: 5,500,647
[45] Date of Patent: Mar. 19, 1996

[54] METHOD FOR DETERMINING THE RANK OF DISTANCE AMBIGUITY OF RADAR ECHOES

[75] Inventor: Bruno Carrara, Meudon, France

[73] Assignee: Thomson-CSF, Paris, France

[21] Appl. No.: 333,987

[22] Filed: Nov. 2, 1994

[30] Foreign Application Priority Data

Nov. 2, 1993 [FR] France ................... 93 12997

[51] Int. Cl.[6] .................................................. G01S 7/292
[52] U.S. Cl. .................... 342/195; 342/159; 342/162
[58] Field of Search ................... 342/159, 160, 342/162, 194, 195, 91, 92, 93

[56] References Cited

U.S. PATENT DOCUMENTS

| | | | |
|---|---|---|---|
| 4,602,258 | 7/1986 | Sarfati | 342/135 |
| 4,972,194 | 11/1990 | Carrara et al. | 342/163 |
| 5,289,192 | 2/1994 | Feedman et al. | 342/158 |
| 5,302,955 | 4/1994 | Schutte et al. | 342/59 |
| 5,311,189 | 5/1994 | Nagel | 340/95 |
| 5,341,142 | 8/1994 | Reis et al. | 342/64 |

FOREIGN PATENT DOCUMENTS

| | | |
|---|---|---|
| 0336273 | 10/1989 | European Pat. Off. . |
| 0073706 | 3/1983 | Germany . |
| 0089284 | 9/1983 | Germany . |
| 2596873 | 10/1987 | Germany . |
| 2260456 | 4/1993 | United Kingdom . |
| WO88/00355 | 1/1988 | WIPO . |

*Primary Examiner*—John B. Sotomayor
*Attorney, Agent, or Firm*—Oblon, Spivak, McClelland, Maier, & Neustadt

[57] ABSTRACT

Disclosed is a method for determining the rank of ambiguity in terms of distance of radar echoes. In a sequence comprising a given number N of recurrences, the method consists, in a first step, in making a retrograde prediction of an echo for the P first recurrences on the basis of the echoes received in the Q last recurrences, in a second step in comparing the echoes actually received in the P first recurrences with the predicted echo and in a third step in determining the rank of ambiguity in distance as a function of the result of the comparison, the rank of ambiguity of an echo being the integer immediately greater than the highest rank of the first recurrences where the difference between the predicted echo and the actually received echo exceeds a threshold that is at least equal to the prediction noise multiplied by a factor of adjustment K. The sum of the numbers P and Q is smaller than or equal to the number N, and is preferably equal to this number N. Application to surveillance or tracking radar. FIG. 3.

9 Claims, 4 Drawing Sheets

000# METHOD FOR DETERMINING THE RANK OF DISTANCE AMBIGUITY OF RADAR ECHOES

BACKGROUND OF THE INVENTION

The present invention relates to a method of determining the rank of ambiguity in distance of radar echoes. It can be applied notably to surveillance radars and also possibly to tracking radars working with low, mean and high frequencies of recurrence for example.

A radar generally sends out bursts of pulses constituting sequences of recurrences, each recurrence being constituted by a pulse followed by a listening period, with one sequence comprising, for example, some recurrences to some tens of recurrences. For a radar working up to a given distance D, the general procedure is to determine the energy required to reach the smallest given target of interest at this given distance D. This distance D defines the duration T of a recurrence by the relationship D=c T/2 where c represents the velocity of the microwaves. Certain targets larger than the given smallest target mentioned here above, located at distances greater than the given distance D, may send back an echo whose energy sufficient is to be detected by the radar. Now, this echo then does not appear in the first recurrence of a sequence for the to-and-fro propagation time of the radar signal exceeds the duration T of a sequence but, from the second recurrence onwards, or in an even higher-ranking recurrence. The radar processing system may then wrongly assume that the target is located within the above-mentioned given distance D. This is the known phenomenon of the ambiguity in distance of radar echoes.

In the working of a radar, the echoes that are ambiguous in distance need special processing. In the case of undesirable fixed echoes, pulses are added to the radar sequencing so as to initialize the input of the Doppler filtering accurately up to the greatest assumed distance of the unwanted echoes, the first recurrences being not processed. These additional pulses take up radar time without providing any advantage to the balance of detection of the useful targets present in the first non-processed recurrence or recurrences.

In the case of moving echoes, whether their detection is desired or not, this method is inefficient and it is necessary to implement a criterion for removing the ambiguity in distance, this criterion being generally based on the use of several bursts of pulses sent out with different periods of recurrence. The echoes then corresponding to the targets located at a distance greater than the given distance D are seen from one sequence to another at a different distance unlike the targets at a distance smaller than the given distance D, which makes it possible to remove the ambiguity. However, this second approach is again costly in terms of radar time.

The aim of the invention is to overcome the above-mentioned drawbacks by making it possible to remove the ambiguity in distance of the radar echoes without making it necessary to have additional radar time.

SUMMARY OF THE INVENTION

To this end, an object of the invention is a method for the determining of the rank of ambiguity in terms of distance of radar echoes within a sequence comprising a given number N of recurrences, wherein said method consists, in a first step, in making a retrograde prediction of an echo for the P first recurrences on the basis of the echoes received in the Q last recurrences, in a second step in comparing the echoes actually received in the P first recurrences with the predicted echo and in a third step in determining the rank of ambiguity in distance as a function of the result of the comparison of the second step, the rank of ambiguity of an echo being the integer immediately greater than the highest rank of the first recurrences where the difference between the predicted echo and the actually received echo exceeds a threshold that is at least equal to the prediction noise multiplied by a factor of adjustment.

The main advantages of the invention are that it can be used to process superimpositions of composite echoes, ambiguous and non-ambiguous echoes, fixed and mobile echoes for example, that it can be adapted to many types of radar and that it is easy to implement.

BRIEF DESCRIPTION OF THE DRAWINGS

Other features and advantages of the invention shall appear from the following description, made with reference to the appended drawings, of which.

MORE DETAILED DESCRIPTION

Figure 1:
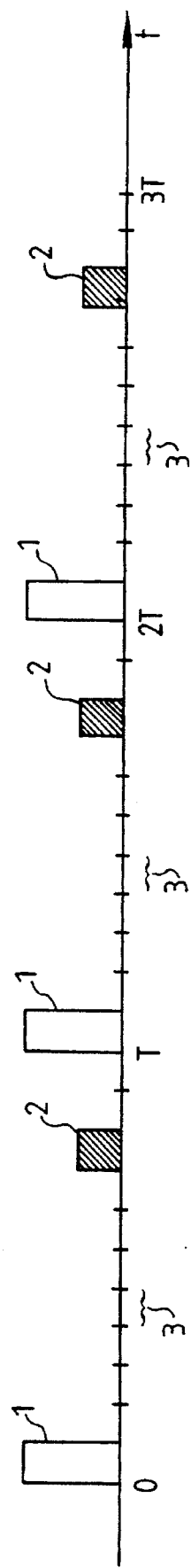
FIG. 1 shows a sequence of radar recurrences.

FIG. 1 gives a view, as a function of the time t, of a sequence comprising for example three recurrences. Each recurrence, having a duration T, is formed by a pulse 1 followed by a listening zone lasting up to the next pulse. A target that is not ambiguous in terms of distance, namely a target located at a distance smaller than the above-mentioned distance D, prompts an echo 2 that appears at the very first recurrence between the initial instant 0 of the sequence and the instant T, where D=c T/2.

The echoes are subjected, for example, to a Doppler filtering for the elimination of those echoes that are unwanted, notably fixed echoes, the sum of the coefficients of the filter being, for example, zero. For a sequence of n recurrences, a filter such as this may be formulated by the following relationship:

$$F_D = \sum_{i=1}^{n} a_i s_i \quad (1)$$

where a given distance compartment or slot 3 of the $i^{th}$ recurrence $s_i$ represents the complex signal representing the amplitude and phase of the echo received and $a_i$ represents the coefficient associated with the given distance compartment of the $i^{th}$ recurrence, the sum of the coefficients of the n recurrences corresponding to the same distance compartment being zero, that is:

$$\sum_{i=1}^{n} a_i = 0$$

In the case of a fixed parasitic echo comprising clutter for example, $s_i$ is constant. It follows that $F_D=0$ and that the parasitic echo may then be eliminated by this Doppler filtering.

In the case of a roving target, the signal received $s_i$ is expressed by the following relationship:

$$s_i = c \, e^{j\phi_i} \quad (2),$$

where $\phi_i$ is the Doppler phase that varies from one recurrence to another. The result thereof is that $$\sum_{i=1}^{n} a_i s_i \neq 0$$

thus making it possible to clearly distinguish these targets from the above-mentioned parasitic targets and thus ensuring that these targets will not be eliminated.

Figure 2:
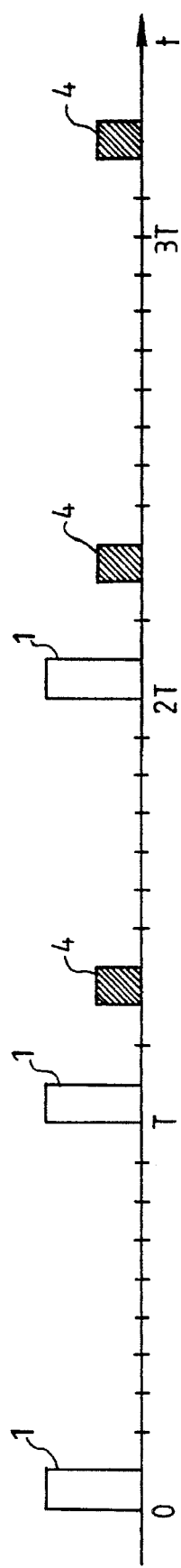
FIG. 2 shows a sequence of radar recurrences comprising an echo that is ambiguous in terms of distance.

FIG. 2 shows an example, in the case of the above sequence, where an echo 4 is sent by a target located at a distance greater than the above-mentioned distance D. In this case, in response to the pulse of the first recurrence, the target sends beck an echo 4 received after a period of time greater than the period T of the recurrences. It arrives for example at the second recurrence. By applying the Doppler filtering defined by the above relationship (1) to this echo 4, it follows that the result of the filtering $F_D$ is not zero, even if the target is fixed. For, in this case $s_i$ is not constant in all the recurrences since, as the echo does not appear in the first recurrence, the first sample s1 is zero while the following samples are non-zero.

The invention uses a method for the prediction of the received signals, for example a method of the type used for high-resolution spectral analysis, to estimate the signal that ought to be present in a given recurrence on the basis of the signals actually received in the last recurrences of the sequence. Indeed, at the end of a sequence, all the signals are present, even the signals 4 of the objects ambiguous in terms of distance. These last recurrences then make it possible, for a given distance compartment, to build models of all the echoes of this compartment, and hence to prepare a prediction, this prediction being of the retrograde type since it is carried out for the first samples on the basis of the last samples.

The methods of high-resolution spectral analysis, based on the assumption that the received signal is governed by a determined model, a self-regressive model for example, may be used for example because they appear to be particularly well suited to many radar signals such as those coming from targets or from clutter for example. A self-regressive model, known to those skilled in the art, is a model where the signal is represented by a white noise filtered by a filter having only poles whose modulus is lower than one. Spectral analysis then consists in adapting the parameters of the model, the number and the position of the poles in the case of use of a self-regressive model for example, these parameters being adapted on the basis of the available samples, the echoes of the last recurrences, so as to minimize the discrepancy between the signal predicted by the model and the signal actually received. The comparison of the estimated signal with the signal actually received makes it possible to detect the absence of one of the echoes in the first recurrences and to thus determine that it is ambiguous in terms of distance.

Figure 3:
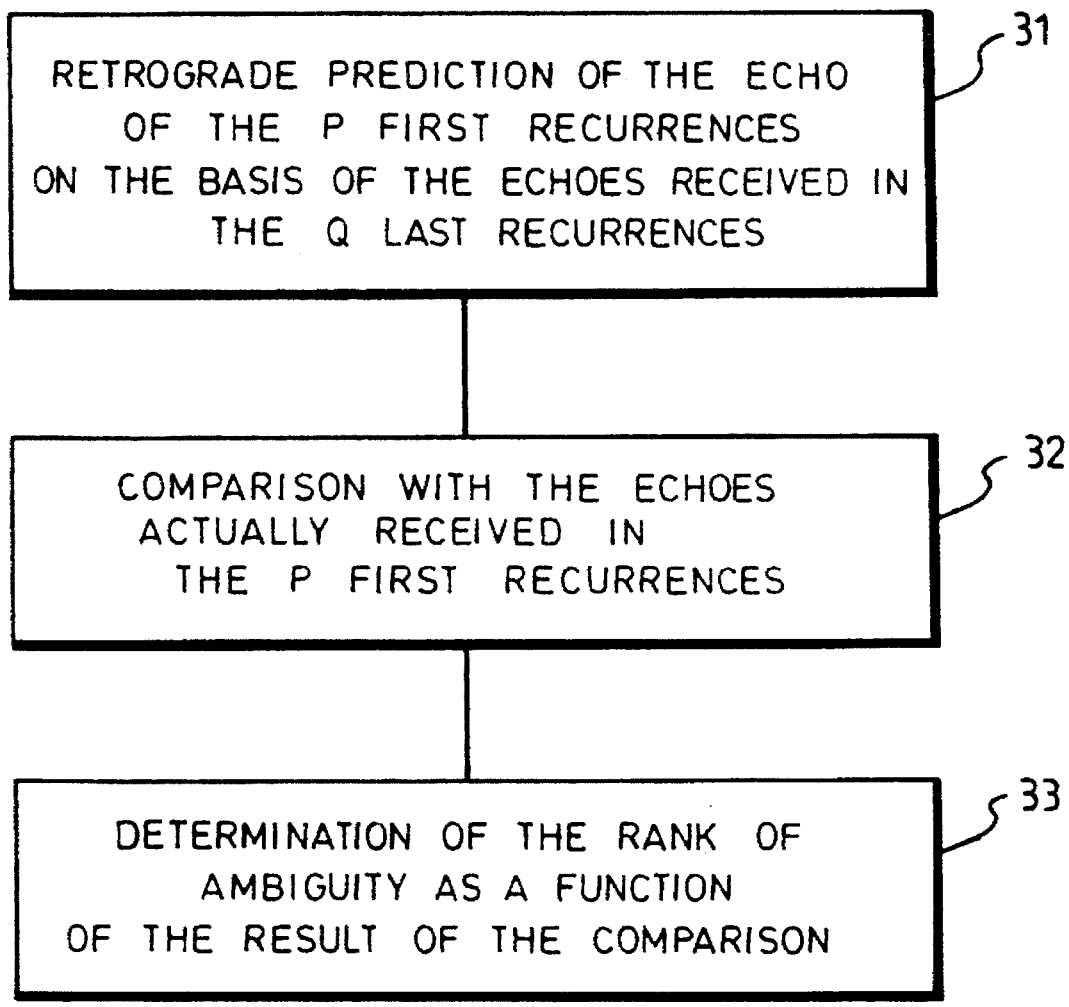
FIG. 3 illustrates the possible steps of the method according to the invention.

FIG. 3 illustrates the possible steps of the method according to the invention. With a sequence or burst comprising N recurrences and with the ambiguity in distance being assumed not to have occurred for the Q last recurrences, the method according to the invention consists, in a first step 31, in predicting for each given distance compartment for example, the echoes of the P first recurrences starting from the Q last recurrences, P+Q being smaller than or equal to N and being preferably equal to N. In this first step 31, the method according to the invention therefore consists in predicting the signal expected in the first, second and up to the $p^{th}$ recurrence of the sequence on the basis of the signals received in the Q last recurrences of the sequence, according to a high-resolution analysis for example, the direction of the prediction being simply inverted since the past is predicted on the basis of the signals, the echoes, of the end of the recurrence, these end echoes being, for example, memorized beforehand so as to enable the prediction to be made.

Figure 4:
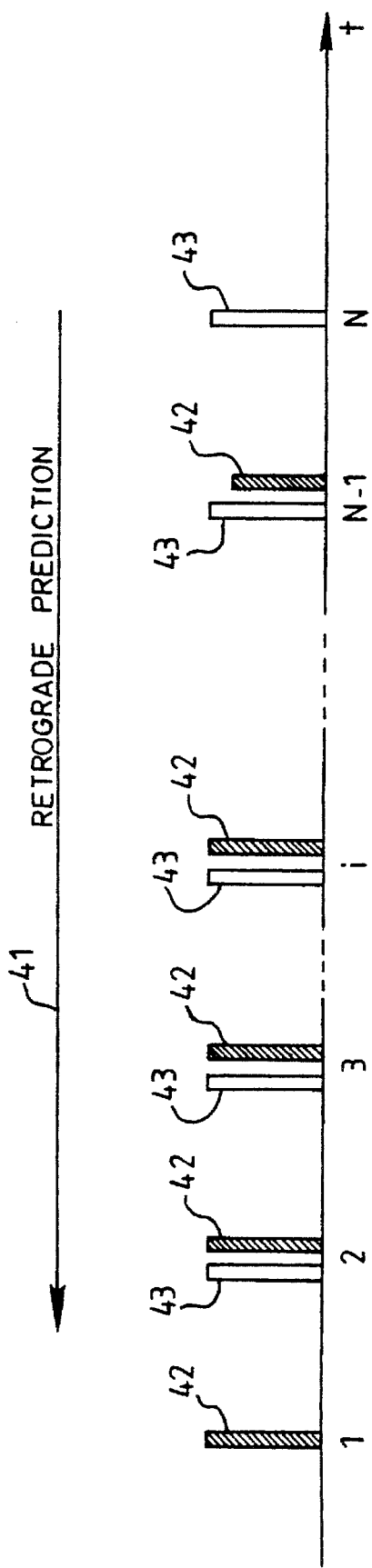
FIG. 4 illustrates an example of retrograde prediction of echoes on the basis of the last recurrences of a sequence.

FIG. 4 illustrates this prediction, with an arrow 41 pointing in reverse to the direction of time t, symbolizing the fact that it is a retrograde prediction.

The numbers located beneath the time axis t indicate the order of the successive recurrences of the sequence shown. The hatched echoes 42 represent the echoes predicted on the basis of the actually received echoes 42. The $N^{th}$ recurrence obviously contains no predicted echo. The N-1st recurrence contains a predicted echo 42 that is normally as yet distant from the actually received echo 43 owing to a lack of later samples required for a retrograde prediction. The closer the recurrences come to the first ones, the more accurate is the prediction.

Returning to FIG. 3, the first step 31 of the method according to the invention is followed by a second step 32 in which the predicted echoes 42 for the P first recurrences are compared successively with the echoes received in these P first recurrences, for example for each distance compartment. To make this comparison, the predicted echo is, for example, deducted coherently from the actually received echoes, the signal that results from this subtraction taking account notably of the prediction noise for all the tested recurrences.

The second step 32 is followed by a third step 33 for determining the lank of ambiguity on the basis of the results of the comparison made in the second step 32.

Thus, since the tests are made at the level of the distance compartments, if the distance compartment considered contains only echoes of targets whose distance is smaller than the above-mentioned given distance D, these echoes being called first-trace echoes, then the result of the coherent subtraction is equal to the prediction noise for all the recurrences tested. If a target echo, included between the distances D and 2D, called a second-trace fixed or mobile echo, is present in the Q last recurrences, then the result of the subtraction will be equal to the second-trace echo predicted for the first recurrence, and to the prediction noise for the following recurrences.

FIG. 4 illustrates such a case. The subtraction between the predicted echo 42 and the echo actually received in the first recurrence is equal to this predicted echo, excepting the prediction noise which is not shown, for the echo actually received appear not in this first recurrence bat starting from the second recurrence as shown in the example of FIG. 4. This echo is ambiguous in terms of distance.

If a fixed or mobile target echo between 2D and 3D, known as a third-trace echo, is present, then the result of the subtraction for the first two recurrences is equal to the predicted third-trace echo and is equal to the prediction noise for the following recurrences, and so on and so forth.

The comparison of the result of the coherent subtraction with a threshold thus makes it possible to determine the rank of ambiguity in distance of the received echo. This rank is the integer immediately higher than the rank of the highest-ranking recurrence for which the threshold is exceeded.

In the example of FIG. 4, the rank of the recurrence having the highest rank is one, hence the rank of ambiguity in terms of distance is two. This means that the echo concerned a so-called second-trace echo, the rank of ambiguity indicating the rank of the trace. The above-mentioned comparison with a threshold can be done quadratically for example, the threshold being crossed when the result of the subtraction is at least greater than the prediction noise multiplied, for example, by an adjustment factor K, which is actually the case if this result is equal to the predicted state. The threshold is not crossed when the result is equal to the prediction noise and when it results from the subtraction of the predicted echo from the actually received echo, the latter echo being truly present in the recurrence. The threshold should be at least equal to the prediction noise. The multiplier factor K enables the adjustment, for an application of the method to a given radar, of the probabilities of determination and of false alarm in the result of the comparison for example. The adjusting factor K may be equal, for example, to one.

The number Q of recurrences used for the predictions is determined, for example, by the duration of the sequence and by the highest rank of ambiguity expected from the echoes received. For each application, this number Q is chosen, for example, to be as great as possible so as to build the most efficient models of the composite signals such as mixtures of fixed and mobile echoes, echoes having different ranks of ambiguity or widened-spectrum echoes such as rain or sea clutter for example.

The method may be applied, for example, after the usual radar processing operations on distance compartments have prompted a detection.

In the case of the use of a method derived from high-resolution spectral analysis for the retrograde prediction of the echoes of the first recurrences, the method of the invention, in addition to the determining of the rank of ambiguity in distance, gives the value of the Doppler frequency of each echo present in the distance compartments. It is then possible to prepare a combined criterion of mobile or fixed echoes and ambiguous or non-ambiguous echoes.

The level of the above-mentioned comparison threshold may be servo-linked, for example, to the ambient thermal noise.

The method according to the invention may be applied, for example, to radar s working at low frequencies of recurrence, medium frequencies of recurrence and high frequencies of recurrence.

What is claimed is:

1. A method for the determining of the rank of ambiguity in terms of distance of radar echoes within a sequence comprising a given number N of recurrences, wherein said method consists, in a first step, in making a retrograde prediction of an echo for the P first recurrences on the basis of the echoes received in the Q last recurrences, in a second step in comparing the echoes actually received in the P first recurrences with the predicted echo and in a third step in determining the rank of ambiguity in terms of distance as a function of the result of the comparison of the second step, the rank of ambiguity of an echo being the integer immediately greater than the highest rank of the first recurrences where the difference between the predicted echo and the actually received echo exceeds a threshold that is at least equal to the prediction noise multiplied by a factor of adjustment.

2. A method according to claim 1, wherein the comparison between predicted signals and received signals is done by a coherent subtraction.

3. A method according to claim 1, wherein the sum of the number P of the first recurrences for which the echo is predicted and of the number Q of the last recurrences used for the prediction is equal to the number N of recurrences of the sequence.

4. A method according to claim 1, wherein the number Q of the last recurrences is a function of the greatest rank of ambiguity expected of the received echoes.

5. A method according to claim 1, wherein the prediction is derived from a high-resolution prediction method.

6. A method according to claim 5, wherein the prediction uses a self-regressive model of echoes.

7. A method according to claim 1, wherein the threshold is a function of the ambient thermal noise.

8. A method according to claim 1, wherein the number Q of the recurrences used for the retrograde prediction is chosen to be as great as possible to build models of the composite signals.

9. A method according to claim 1, applied after the usual radar processing to the compartments that have given rise to a detection.

* * * * *